United States Patent

[11] 3,556,261

| [72] | Inventor | Billy Gene Pugh |
| | | P. O. Box 802, Corpus Christi, Tex. 78403 |
| [21] | Appl. No. | 827,591 |
| [22] | Filed | May 26, 1969 |
| [45] | Patented | Jan. 19, 1971 |

[54] PERSONNEL LOWERING DEVICE AND BRAKE THEREFOR
4 Claims, 7 Drawing Figs.

[52] U.S. Cl. .................................................. 188/78,
192/76; 254/151, 254/154, 254/186
[51] Int. Cl. ........................................................ F16d 51/12
[50] Field of Search ........................................... 188/78.22,
78.33, 78.5, 83; 277/2, 1R; 254/151, 154, 186;
242/99, 156; 192/76

[56] References Cited
UNITED STATES PATENTS

| 456,282 | 7/1891 | Athey .......................... | 254/154 |
| 2,390,168 | 12/1945 | Piot ............................ | 279/24X |

*Primary Examiner*—George E. A. Halvosa
*Attorney*—Lloyd P. Shank

ABSTRACT: A device of compact size for lowering individuals from elevated positions and its weight is such that it may be carried as a part of survival equipment. The device includes a cable wound on a drum and an adjustable brake mechanism for the drum which enables a pilot whose parachute is entangled in a tree to lower himself safely to the ground.

PATENTED JAN 19 1971

INVENTOR
BILLY GENE PUGH
BY
ATTORNEY

INVENTOR
BILLY GENE PUGH

BY

ATTORNEY

PERSONNEL LOWERING DEVICE AND BRAKE THEREFOR

The present invention relates to a cable and drum assembly equipped with a brake mechanism which is useful in lowering an individual from an elevated position and the invention more specifically pertains to an adjustable brake mechanism which may be actuated by the individual being lowered whereby the rate of descent may be controlled.

A pilot in parachuting from a disabled plane often has the parachute canopy entangled or ensnared by the branches of the top of a tree. The pilot is often left hanging as much as one hundred feet above the ground. Efforts by such pilots to attain safety of the ground without help has resulted in a number of deaths. It is accordingly an object of the present invention to provide a device which may be employed by a pilot in such a predicament to lower himself safely to the ground.

Another object of the invention is to provide a device which includes a drum on which a cable is wound including an adjustable brake mechanism under the control of the individual being lowered so that the rate of descent may be controlled and to provide such a unit of little mass so that it may readily be carried by pilots or others engaged in rescue work.

Other objects and features of the invention will be appreciated and become apparent as the present disclosure proceeds and upon consideration of the following detailed description taken in conjunction with the accompanying drawings wherein an embodiment of the invention is disclosed.

Figure 1:
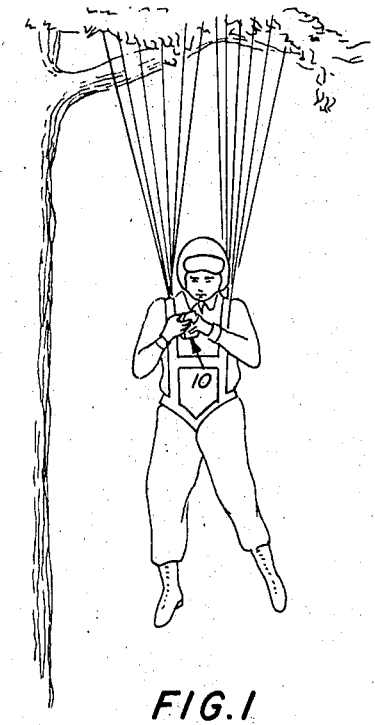
FIG. 1 is a diagrammatic view of a parachutist with the canopy portion of the parachute entangled in the upper portion of a tree.
Figure 2:
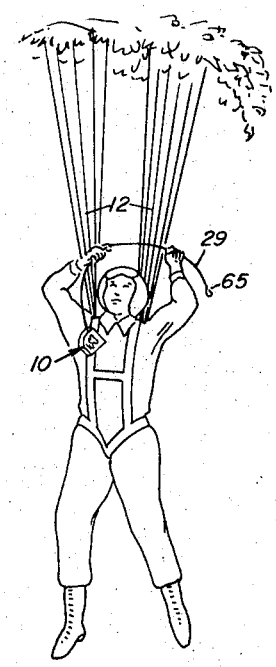
FIG. 2 is a similar view illustrating the manner by which a free end portion of the lowering cable is attached to the parachute risers.
Figure 3:
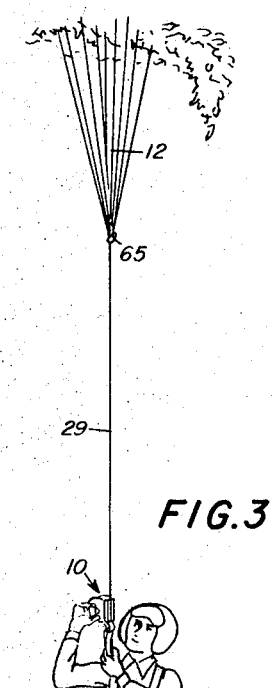
FIG. 3 is a diagrammatic view showing the position of the lowering device in relation to the individual being lowered.

The invention has particular utility for use by a pilot who has found it necessary to escape from an airplane by means of a parachute. The parachute may become entangled in a tree so that the pilot is left hanging in a position where he is unable to reach limbs of the tree as shown in FIG. 1. The pilot may be supported by the parachute risers at levels of as much as one hundred feet above the ground. A lowering device exhibiting the invention is shown at 10 and it is first attached to a ring (not shown) on the torso harness. The cable 29 of the device is then attached to the parachute risers 12 as shown in FIG. 2. Thereafter the pilot detaches the risers 12 from the torso harness and employs the lowering device 10 for descent to the ground and at a rate which may be controlled as diagrammatically illustrated in FIG. 3.

Figure 4:
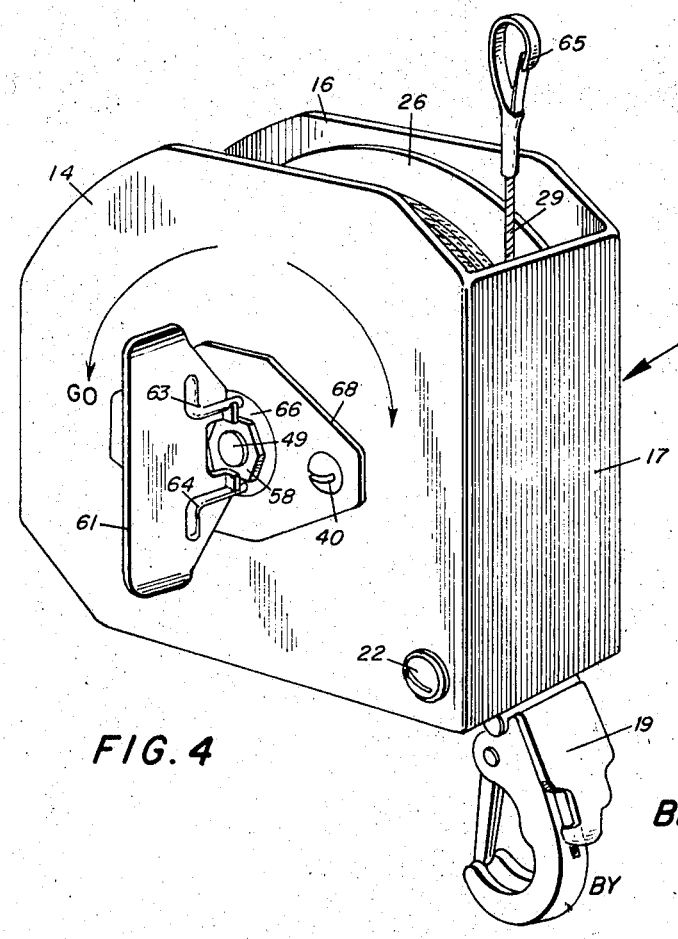
FIG. 4 is a perspective view of a lowering device embodying the invention.
Figure 5:
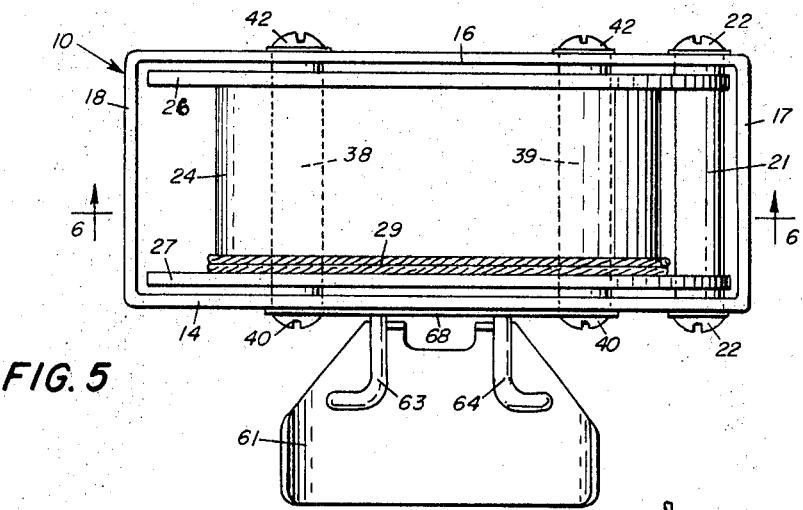
FIG. 5 is a plan view of the device with the major portion of the lowering cable omitted.

The device shown generally at 10 includes a frame formed of lightweight metal having sidewalls 14 and 16 joined by end walls 17 and 18. A hook 19 is pivotably secured to a pin 21 which extends between the sidewalls and secured thereto by cap screws 22. The pin 21 and the hook 19 are attached to the frame in a lower corner thereof as shown in FIG. 4.

A drum 24 is mounted for rotation between the sidewalls 14 and 16 and it includes flanges 26 and 27 to provide an annular trough throughout the periphery of the drum for accommodating a cable 29 which is wound on the drum with the inner end thereof securely attached to the drum 24. The inner concave surface 31 on the drum serves as an annular surface for engagement by brake shoes 33 and 34 and the drum is journaled for rotation about the brake shoes while restrained from lateral movements by the sidewalk 14 and 16.

Figure 6:
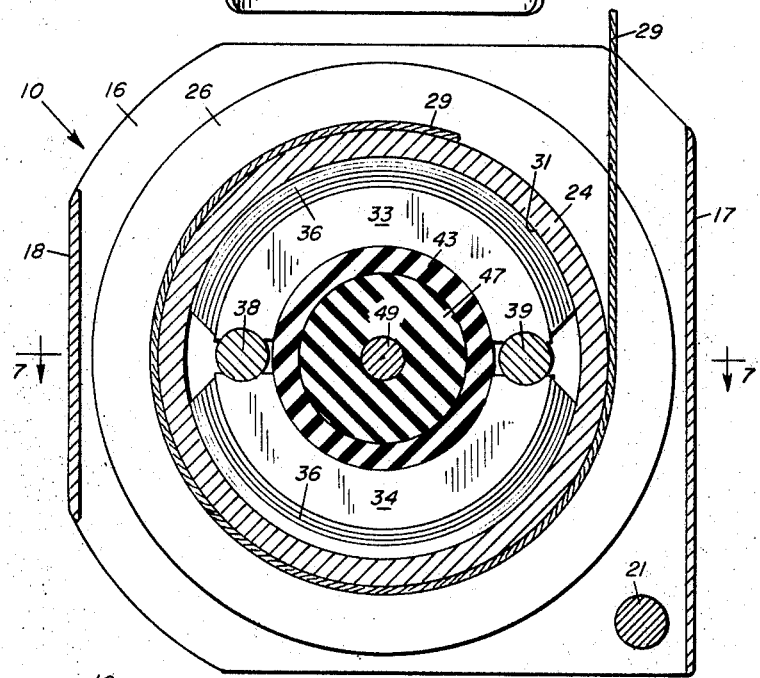
FIG. 6 is a sectional view taken on the line 6-6 of FIG. 5.

As best shown in FIG. 6 each brake 33 and 34 is equipped with a brake lining 36, which has a convex exterior surface fitted closely adjacent the cylindrical inner surface 31 of the drum 24. A pin 38 is mounted between adjacent ends of the brake shoes 33 and 34 and another pin 39 is mounted between the other adjacent ends of the brake shoes. The pins 38 and 39 extend through openings in the sidewalls 14 and 16 as shown in FIG. 7 and the ends of the pins 38 and 39 may be secured to the sidewalls walls in any suitable manner such as by means of cap screws 40 and 42.

Figure 7:
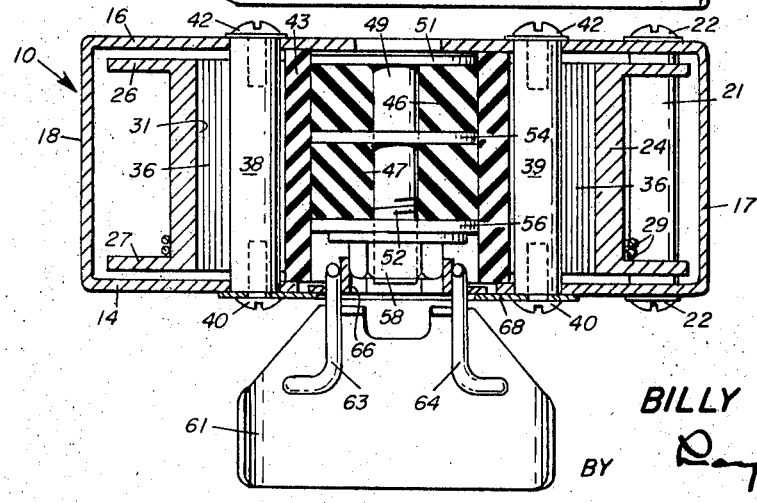
FIG. 7 is a sectional view taken on the line -7-7 of FIG. 6.

A tube 43 formed of dense resilient material such as rubber or similar material fits within the brake shoes 33 and 34 as shown in FIGS. 6 and 7. Two bushings 46 and 47 are mounted on a shaft 49 which is in the form of a bolt having a relatively large head 51 and threads 52 at the opposite end thereof. The bushings 46 and 47 are formed of dense resilient material such as rubber or like material and in the undistorted condition fit snugly about the shaft 49 and snugly within the tube 43. A metal washer 54 is provided around the shaft 49 between the bushings 46 and 47. Another metal washer 56 surrounds the shaft 49 and overlies the free end face of the bushing 47.

A nut 58 engages the threads 52 on the bolt or shaft 49. A brake adjustment handle 61 is mounted on the sidewall 14. The handle 61 is in the form of a plate and arms 63 and 64 extending therefrom carry a socket 66 which spans the nut 58. The handle and the socket member 66 are secured to the sidewall 15 by means of a plate 68. The handle 61 is for the purpose of threading the nut 58 on the bolt 49 and the handle is mounted on the socket member 66 so that it may be hinged to lie in a plane parallel to the sidewall 14 to facilitate compact packing of the device.

In operation and when an individual is to be lowered from an elevated position, the cable 29 which is equipped with a hook 65 at the free end thereof is first secured to parachute risers 12 or to a substantial limb of the tree or to any other fixed structure or to some firm fixture on a cliff. Thereafter the hook 19 is secured to a harness which embraces the body of the individual to be lowered. The brake adjustment handle 61 is rotated to thread the nut 58 towards the head 51 of the shaft 49. Such action applies force to the outer ends of the bushings 46 and 47. The resilient material is confined between the washer 56 and the bolt head 51. The bushings 46 and 47 are deformed radially outward at their peripheries and this causes the tube 43 to be deformed outwardly which in turn applies force to circumferential portions of the brake shoes 33 and 34. The linings 36 are thus moved into frictional engagement with the inner peripheral surface 31 of the drum 24. The individual man then initiate the lowering movement by slowly releasing the brake mechanism which is under control of the handle 61. The handle is within the reach of the individual so that adjustments in the braking force may be made to control the rate of descent. The braking action tends to develop torque on the frame in one circumferential direction but this force is opposed by the position of the pin 21 and the hook 19.

While the device has particular utility for use by pilots it may be employed in other instances where individuals may be lowered from burning buildings or may be lowered from an offshore oil-drilling platform to a boat and for purposes of lowering individuals from cliffs in rescue activity. Numerous changes may be made in the details of the device as well as the overall assembly. Such modifications and others, may be made without departing from the spirit and scope of the invention as set forth in the appended claims.

I claim:

1. A personnel lowering device comprising a frame, a hook attached to the frame, a drum with a cable wound thereon mounted for rotation on said frame, an annular surface within said drum, brake shoes within said drum in positions to frictionally engage said annular surface, means preventing rotation of the brake shoes relative to the frame, a bushing within the brake shoes formed of dense resilient material, rigid means within said bushing preventing displacement of the resilient material away from the brake shoes, an abutment at each end of said bushing preventing displacement of the resilient material laterally of the brake shoes, and means for moving one of said abutments towards the other whereby the resilient material of the bushing is displaced toward the brake shoes to force the brake shoes into frictional engagement with said annular surface.

2. A personnel lowering device according to claim 1 wherein the means for moving one abutment towards the other includes a shaft with a nut threaded thereon, and a handle outside of the frame for rotating the nut.

3. A personnel lowering device according to claim 1 including a sleeve of dense resilient material between the brake shoes and said bushing.

4. A personnel lowering device according to claim 1 wherein two bushings are arranged end-to-end to within the brake shoes with a rigid abutment member between the adjacent ends of the bushings.